United States Patent [19]

Dexter, Jr.

[11] Patent Number: 4,924,049

[45] Date of Patent: May 8, 1990

[54] BACON BOX

[76] Inventor: Fred E. Dexter, Jr., P.O. Box 423, Red Hook, N.Y. 12571

[21] Appl. No.: 369,209

[22] Filed: Jun. 21, 1989

[51] Int. Cl.$^5$ .............................................. H05B 6/80
[52] U.S. Cl. .............................. 219/10.55 E; 99/425; 99/444; 99/DIG. 14; 426/243
[58] Field of Search ................. 219/10.55 E, 10.55 F, 219/10.55 R; 99/422, 425, 441, 444, 446, 451, DIG. 14; 426/242, 243; 126/390

[56] References Cited

U.S. PATENT DOCUMENTS

| | | | |
|---|---|---|---|
| 3,321,314 | 5/1967 | Jeppson | 219/10.55 |
| 4,074,102 | 2/1978 | Asen | 219/10.55 E |
| 4,112,833 | 9/1978 | Oda et al. | 219/10.55 E |
| 4,214,515 | 7/1980 | Kubiatowicz | 219/10.55 E |
| 4,343,978 | 8/1982 | Kubiatowicz | 219/10.55 E |
| 4,398,077 | 8/1983 | Freedman et al. | 219/10.55 E |

*Primary Examiner*—Philip H. Leung
*Attorney, Agent, or Firm*—Fleit, Jacobson, Cohn, Price, Holman & Stern

[57] ABSTRACT

A bacon box includes a base rack unit over which bacon is hung for cooking and a cover unit for the base rack unit. The base rack unit design is rectangular with approximate dimensions of six inches high, three inches wide and seven inches long. This overall dimensioning is achieved by use of a base rack unit including two vertical end plates six inches high by three inches wide. The end plates are connected to each other by two parallel upper support rods spaced approximately one inch apart and by two parallel lower support rods spaced approximately one inch apart and in vertical alignment with the upper support rods. All four support rods are approximately seven inches long. The upper support rods are located about $\frac{3}{8}$ of an inch from the top plane of the vertical end plates. The lower support rods are positioned about $1\frac{1}{4}$ inches below the upper support rods. The cover unit fits snugly over the top and along the sides of the base rack unit. The cover unit performs the function of making the bacon box into a combined convection oven and moisturizing chamber.

14 Claims, 2 Drawing Sheets

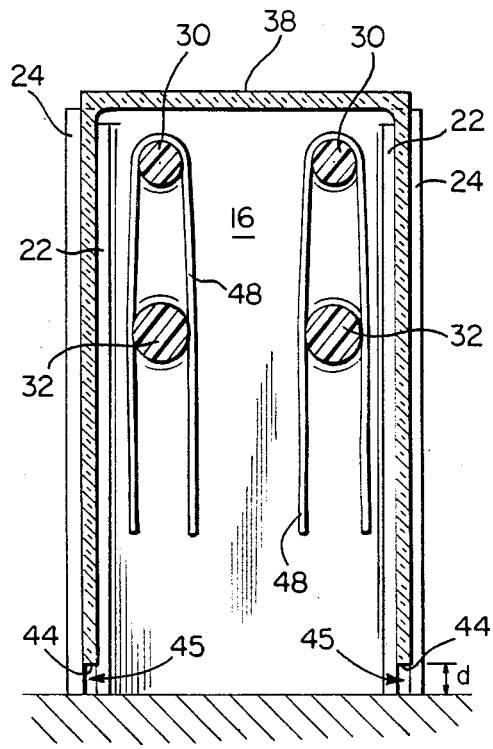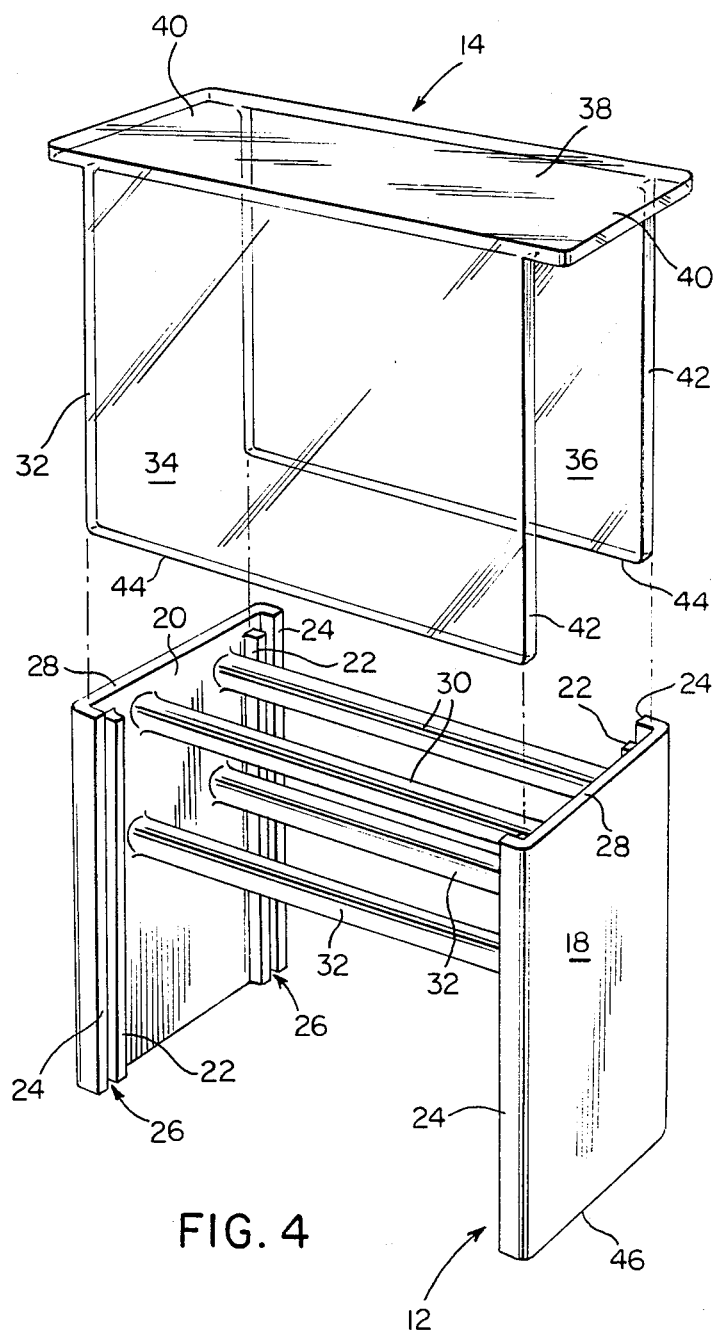
FIG. 3
FIG. 4

BACON BOX

FIELD OF THE INVENTION

The present invention permits the cooking of single/multiple slices of bacon in a vertical position in a microwave oven.

BACKGROUND OF THE INVENTION

Various attempts have been made to cook bacon in a microwave oven. For example, in U.S. Pat. No. 4,112,833 to Oda et al. and U.S. Pat. Nos. 4,214,515 and 4,343,978 to Kubiatowicz, devices are disclosed for microwave cooking of bacon. Each of these patents disclose a device which allows fat and grease from the bacon to be expelled during cooking.

As the result of the use of known devices for microwave cooking of bacon, a cleaning of the entire microwave is required after each use due to the splattering of the grease released from the bacon during cooking.

It is a problem of known bacon cooking devices to evenly cook bacon as well as containing the resultant grease which is caused to splatter during cooking of the bacon.

SUMMARY OF THE INVENTION

By the present invention, cooking of a single/multiple slices of bacon in a vertical position in a microwave oven is achieved. The resulting cooked bacon has a much lower fat residue than horizontally cooked bacon due to the vertical cooking allowing the heat liquified fat to drip off of and remain completely separated from the cooked bacon. By the present invention a greater amount of undesirable fat is removed from the cooked bacon resulting in a more nutritious method of preparation of bacon. The cooked bacon also provides a lighter, crispier, more palatable piece of bacon.

The bacon box of the invention includes a base rack unit over which the bacon is hung for cooking and a cover unit for the base rack unit. The base rack unit design is rectangular with approximate dimensions of six inches high, three inches wide and seven inches long. This overall dimensioning is achieved by use of a base rack unit including two vertical end plates six inches high by three inches wide. The end plates are connected to each other by two parallel upper support rods spaced approximately one inch apart and by two parallel lower support rods spaced approximately one inch apart and in vertical alignment with the upper support rods. All four support rods are approximately seven inches long. The upper support rods are located about $\frac{3}{8}$ of an inch from the top plane of the vertical end plates. The lower support rods are positioned about $1\frac{1}{4}$ inches below the upper support rods.

The rack formed by the upper and lower support rods accommodates single or multiple strips of bacon. Each piece of bacon is hung over the top rod crosswise at the midpoint of the bacon strip such that the ends of the bacon hang approximately equal in length, vertically downward from the upper support rods, passing on opposite sides of the lower support rods. The two rows of upper and lower support rods allow cooking of two separate rows of vertically downward hanging bacon. The bacon is carefully hung on the upper support rods to prevent overlap of the slices and sticking together of the slices during cooking.

After the bacon is placed onto the base rack unit, the cover unit is placed over the base rack unit. The cover unit is a closefitting, three-sided cover that surrounds the top and sides of the base rack unit. The cover unit is slipped over the base rack unit from above prior to placing the assembled bacon box in a microwave oven. During use, the bacon box is placed upon an absorbent material, such as a paper towel, which is located on a microwave compatible dish or paper plate.

Cooking time varies according to number and thickness of the bacon slices, however, cooking time will be similar to that for regular (horizontal) microwave oven cooking of bacon. After cooking, the bacon box and the support dish or paper plate is removed with the paper towel from the microwave oven. The cover unit is lifted off the base rack unit to remove the bacon for serving. The fat laden paper towel is discarded.

The base rack unit provides the dual function of supporting the bacon in a vertical position for cooking, and also of preventing the bacon strip ends from touching and sticking to each other during the cooking process.

The bacon support function is accomplished by an upper position rod of the base rack unit over which each strip of bacon is separately hung side by side. The lower rod positioned about $1\frac{1}{4}$ inches below the upper rod divides and holds apart the two hanging ends of each bacon strip hanging on either side of the lower support rod. As the bacon cooks, it shrinks greatly in length within the bacon box. The shortening of the bacon causes the bacon to rise on either side of the lower support rod. Any potential sticking together of the ends of the bacon is prevented as the ends are continuously separated by the lower support rod as the bacon cooks and shrinks.

During cooking, due to the hanging of the bacon strips from the upper support rod, the contact surface where the bacon rests upon the upper support rod absorbs heat and transfers the heat away from the cooking bacon. This would normally result, without the cover unit, in a severely undercooked area in each bacon strip. The cover unit contains the overall heat generated in cooking the bacon and, by convection, focuses the greatest amount of heat in the upper area of the bacon box. The upper support rods are mounted very close to the top inner surface of the cover unit to take greatest advantage of the heat concentration at the uppermost portion of the box to offset the heat dissipating effect of the upper support rod at the contact area of the cooking bacon.

It is beneficial to select a material for the upper support rod which is a poor conductor of heat so as to assist in minimizing the loss of cooking heat from the bacon at the area where the bacon contacts the upper support bar. Of course, this material must be of a microwave oven compatible material.

The cover unit also has the function of containing the moisture released during the cooking process. The moisture retention design allows for longer, more thorough cooking of the bacon with a significantly reduced risk of burning the bacon. The effect of this moisturized cooking is complimentary to the vertical dripping effect used to dry out the bacon. Cooking the bacon longer without burning assists in releasing more bacon fat which then vertically drips downward for a desired light, crisp texture. By this system, messy grease splatter on the inside walls of the microwave oven is prevented during microwave cooking of bacon. A $\frac{1}{4}$ inch spacing or gap between the lowermost edge of the side of the cover unit and the bottom of the base rack unit allows excess vapors to escape from the interior of the bacon box.

It is an object of the present invention to provide a bacon box for cooking of bacon in a microwave oven with a convection heat effect.

It is another object of the present invention to provide a bacon box for cooking of bacon in a microwave oven with a convection heat effect formed by a base rack unit and a cover unit snugly fitting over the base rack unit.

It is yet another object of the present invention to provide a bacon box for cooking of bacon in a microwave oven with a convection heat effect formed by a base rack unit and a cover unit snugly fitting over the base rack unit, the base rack unit having two pairs of vertically spaced rods with the lower pair of vertically spaced rods separating opposite ends of a strip of bacon which is hung over the upper pair of vertically spaced support rods.

It is a further object of the present invention to provide a bacon box for cooking of bacon in a microwave oven with a convection heat effect formed by a base rack unit and a cover unit snugly fitting over the base rack unit the base rack unit having two pairs of vertically spaced rods with the lower pair of vertically spaced rods separating opposite ends of a strip of bacon which is hung over the upper pair of vertically spaced support rods with the cover unit at the bottom edges being separated from the bottom edge of the base rack unit by a predetermined spacing to allow excess vapors to escape from the bacon box during microwave cooking.

These and other objects of the invention, as well as many of the intended advantages thereof, will become more readily apparent when reference is made to the following description take in conjunction with the accompanying drawings.

BRIEF DESCRIPTION OF THE DRAWINGS

FIG. 3 is a sectional view of FIG. 2 taken along line 3—3.

FIG. 4 is an exploded view of a base rack unit and cover unit forming the bacon box of the present invention.

DETAILED DESCRIPTION OF THE PREFERRED EMBODIMENTS

Figure 1:
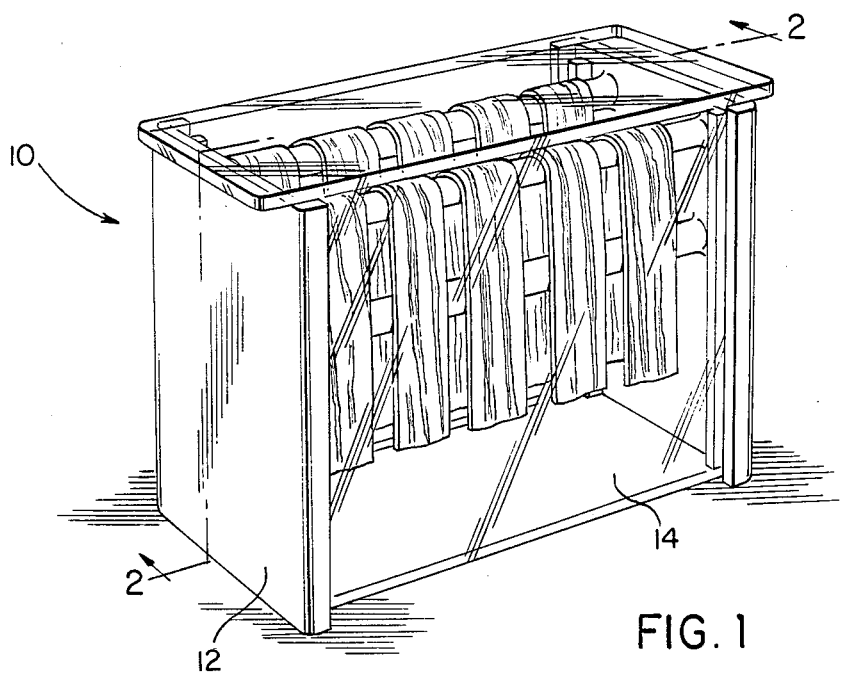
FIG. 1 is a perspective view of a bacon box embodying the teachings of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIG. 1, in particular, a bacon box embodying the teachings of the subject invention is generally designated as 10. With reference to FIG. 1, the bacon box 10 includes a base rack unit 12 and a cover unit 14. The cover unit 14 fits snugly over the base rack unit so as to define an interior cooking space 16.

Both the base rack unit 12 and the cover unit 14 are made of a microwave oven compatible material so that repeated use in a microwave oven will not affect the durability of the bacon box. An example of such material is PYREX which is available from Corning Glassworks, Corning, N.Y., or some type of rigid plastic which is normally used in microwave oven cookware.

As shown in FIG. 4, base rack unit 12 includes two vertically extending, parallel plates 18 and 20. The lateral edges of the plates 18 and 20 include two pairs of perpendicular projections 22 and 24, with projections 22 being spaced inwardly of the projections 24. Defined between projections 22 and 24 is a channel 26 for receipt of the edges of the side walls of the cover unit 14.

Spaced at a distance of ½ inch or less from a top edge 28 of the parallel plates 18 and 20 are two parallel upper support rods 30. These upper support rods are located adjacent to the top edge 28 of the parallel plates 18 and 20. Located approximately 1¼ inches below the upper support rods 30, in the same vertical plane, are parallel lower support rods 32. In addition, the upper support rods have a diameter of approximately ⅜ inch, whereas the lower support rods have a diameter of approximately ½ inch.

Cover unit 14 includes two parallel, vertically extending side walls 34 and 36. The parallel side walls 34, 36 are interconnected by a perpendicular top plate 38 which extends beyond the peripheral edges of the side walls 34 and 36, in a longitudinal direction, to form handle gripping portions 40. The side walls 34, 36 and top plate 38 may be of integral or separate piece construction as long as the cover unit is of a microwave oven compatible material.

In practice, the side wall edges 42 of the side plates 32, 34 are of a thickness so as to snugly fit within the channels 26 of the base rack unit 12. The cover unit is slid down within the channels 26 until the top plate 38 engages the top edges 28 of the parallel side plates 18, 20. The enclosed cooking space 16 is thereby defined by the side plates 18, 20, side walls 34, 36 and top plate 38. A paper towel on a paper, plastic or ceramic plate (not shown) is placed under the lowermost edges 46 of the base rack unit 12 so as to collect grease as it drips from the cooking bacon.

It is important to note that there is a separation gap "d" between the lowermost edges 44 of the side walls 34 and 36 and the lowermost edges 46 of the side plates 18 and 20, of approximately ¼ inch so as to allow escape of hot air collected within the cooking space 16 through relief space 45. Locating the gap at the bottom of the bacon box insures that the cooking space has been filled with hot vapors prior to release of the excess vapors from the bottom of the box.

Figure 2:
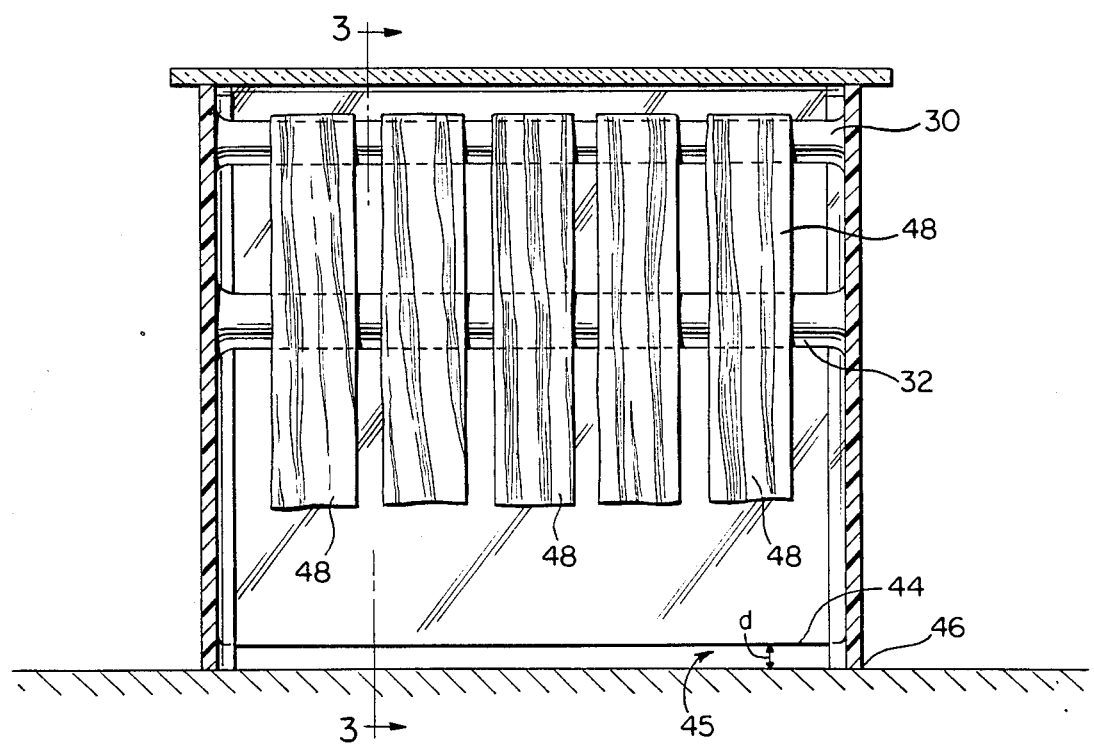
FIG. 2 is a sectional view of FIG. 1 taken along line 2—2.

As shown in FIGS. 1 through 3, bacon strips 48 are placed over the upper support rods 30 so as to straddle the upper support rods and hang down on opposite sides of the lower support rods 32. The lower support rods 32 keep the opposite ends of the strips of bacon from contacting each other and sticking together during cooking.

When the cover unit 14 is placed into the channels 26 of the base rack unit, the cooking space 16 forms a combined convection oven and moisturizing chamber. The channels 26 serve to hold the cover unit in correct alignment with the base rack unit for a close fit during cooking.

The heat generated during the cooking of the bacon in a microwave oven is used to cook the portion of the bacon strips in contact with the upper support bars 30 since the greatest amount of heat is concentrated in the upper area of the box. Since the upper bars are close to the uppermost edges 28 of the side plates 18, 20, the concentrated heat is used to increase the heat of the bacon strips at the point of contact of the bacon strips and the upper support rods.

Moisture is retained within the sealed cooking space formed by the cover unit and base rack unit so as to allow longer, more thorough cooking times for the bacon without a risk of burning the bacon. The bacon fat released during microwave cooking is allowed to vertically drip downward for collection by a paper towel located underneath the lowermost edges of the base rack unit.

The upper support rods 30 are spaced above the lowermost edges 46 of the side plates 18 and 20 to allow the hanging of standard size uncooked refrigerated bacon strips without contacting the paper towel located below the base rack unit. Some contact with the paper towel below the base rack unit, resulting from uneven hanging of the bacon strips, is not a significant concern as the bacon shrinks significantly, and rises, as it is cooked.

Having described the invention, many modifications thereto will become apparent to those skilled in the art to which it pertains without deviation from the spirit of the invention as defined by the scope of the appended claims.

I claim:

1. A box for microwave cooking, said box comprising:
    a base rack unit having support means for supporting a central portion of a bacon strip to be heated so that lateral portions of the bacon strip hang downwardly from said support means when the central portion of the bacon strip is supported by said support means, and
    a cover unit removably mounted on said base rack unit and defining with said base rack unit an enclosed cooking space for microwave cooking, said cover unit fitting on said base rack unit so as to define a relief space for excess vapors to escape from the enclosed cooking space when said cover unit is mounted on said base rack unit, said base rack unit including side plates having longitudinally extending supports extending between said side plates to form said support means.

2. A box for microwave cooking as claimed in claim 1, wherein a rod extends between said side plates below each of said supports in a same vertical plane as said supports for spacing ends of the lateral portions as they hang from said supports.

3. A box for microwave cooking as claimed in claim 1, wherein said cover unit includes side edges and said base rack unit includes projections defining channels for receipt of said side edges of said cover unit for snugly mounting of said cover unit on said base rack unit.

4. A box for microwave cooking as claim in claim 1, wherein said supports extend horizontally between said side plate which extend vertically.

5. A box for microwave cooking as claimed in claim 4, wherein said supports are located adjacent to an uppermost edge of said side plates.

6. A box for microwave cooking as claimed in claim 5, wherein said cover unit includes handle portions which project beyond said side plates when said cover unit is mounted on said base rack unit.

7. A bacon box for microwave cooking of bacon strips, said bacon box comprising:
    a base rack unit having two vertically extending side plate interconnected by two pairs of two parallel, horizontally extending rods for supporting a bacon strip to be heated by uppermost rods and for spacing lower portions of the bacon strip by lowermost rods, each of said rods in each pair of rods being vertically spaced from each other, and
    a cover unit having parallel side walls interconnected by a top plate, and
    a channel formed on opposite, lateral side edges of said side plates for receipt of opposite, lateral side edges of said side walls when said cover unit is mounted on said base rack unit,
    said cover unit being slidably mounted on said base rack unit to a point where said top plate contacts an uppermost edge of said side plates to define a relief space for cooking vapors between a lowermost edge of said side walls and a lowermost edge of said side plates.

8. A box for microwave cooking as claimed in claim 7, wherein a cooking space is defined between said side plates, said side walls and said top plate when said cover unit is mounted on said base rack unit.

9. A box for microwave cooking, said box comprising:
    a base rack unit having support means for supporting a central portion of a bacon strip to be heated so that lateral portions of the bacon strip hang downwardly from said support means when the central portion of the bacon strip is supported by said support means, and
    a cover unit removably mounted on said base rack unit and defining with said base rack unit an enclosed cooking space for microwave cooking, said cover unit fitting on said base rack unit so as to define a relief space for excess vapors to escape from the enclosed cooking space when said cover unit is mounted on said base rack unit,
    the relief space being located between a lowermost edge of said cover unit and a lowermost edge of said base rack unit when said cover unit is mounted on said base rack unit.

10. A box for microwave cooking as claimed in claim 9, wherein said base rack unit includes projections defining channels for receipt of side edges of said cover unit for snugly mounting of said cover unit on said base rack unit.

11. A box for microwave cooking as claimed in claim 9, wherein said base rack unit includes side plates having longitudinally extending support rods extending between said side plates to form said support means.

12. A box for microwave cooking as claimed in claim 11, wherein an additional rod extends between said side plates below each of said support rods in a same vertical plane as said support rods.

13. A box for microwave cooking as claimed in claim 11, wherein said support rods extend horizontally between said side plates which extend vertically.

14. A box for microwave cooking as claimed in claim 13, wherein said support rods are located adjacent to an uppermost edge of said side plates.

* * * * *